(12) United States Patent
Fujiwara

(10) Patent No.: US 9,783,151 B2
(45) Date of Patent: Oct. 10, 2017

(54) VEHICLE SIDE AIRBAG DEVICE

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/535,889

(22) Filed: Nov. 7, 2014

(65) Prior Publication Data

US 2015/0137493 A1    May 21, 2015

(30) Foreign Application Priority Data

Nov. 15, 2013   (JP) ................................ 2013-237238

(51) Int. Cl.
| | | |
|---|---|---|
| *B60R 21/233* | (2006.01) | |
| *B60R 21/207* | (2006.01) | |
| *B60R 21/2338* | (2011.01) | |
| *B60R 21/231* | (2011.01) | |

(52) U.S. Cl.
CPC .......... *B60R 21/233* (2013.01); *B60R 21/207* (2013.01); *B60R 21/2338* (2013.01); *B60R 21/23138* (2013.01); *B60R 2021/23146* (2013.01); *B60R 2021/23324* (2013.01); *B60R 2021/23382* (2013.01)

(58) Field of Classification Search
CPC ............. B60R 21/233; B60R 21/21138; B60R 2021/23146; B60R 2021/23308; B60R 2021/23324; B60R 2021/23382; B60R 21/207

See application file for complete search history.

(56) References Cited

U.S. PATENT DOCUMENTS

| | | | | |
|---|---|---|---|---|
| 5,899,490 | A * | 5/1999 | Wipasuramonton et al. ................... | 280/730.2 |
| 6,270,113 | B1 * | 8/2001 | Wipasuramonton et al. ................... | 280/730.2 |
| 6,478,329 | B1 * | 11/2002 | Yokoyama ................ | 280/729 |
| 7,338,070 | B2 * | 3/2008 | Madasamy et al. ....... | 280/730.2 |
| 7,770,921 | B2 * | 8/2010 | Mueller et al. ........... | 280/739 |
| 8,480,124 | B2 * | 7/2013 | Rickenbach et al. ..... | 280/730.2 |
| 8,480,128 | B2 * | 7/2013 | Fukawatase et al. ..... | 280/743.1 |
| 8,931,801 | B2 * | 1/2015 | Feller et al. .............. | 280/743.1 |
| 2004/0119269 | A1 * | 6/2004 | Yokota et al. ............ | 280/730.2 |

(Continued)

FOREIGN PATENT DOCUMENTS

| | | |
|---|---|---|
| JP | 2005-029073 A | 2/2005 |
| JP | A-2008-201175 | 9/2008 |

(Continued)

*Primary Examiner* — Ruth Ilan
(74) *Attorney, Agent, or Firm* — Oliff PLC

(57) ABSTRACT

A vehicle side airbag device includes: an inflator for generating gas by activation; a bag body provided in a side portion of a seatback of a vehicle seat and configured to be inflated and deployed toward a vehicle front side relative to the side portion when the gas is supplied thereinside; and a partition portion partitioning the bag body into a front bag portion and a rear bag portion to be inflated at a higher pressure than the front bag portion and having a thicker inflation width in a vehicle width direction than that of the front bag portion, the partition portion being overlapping with a central part of a shoulder of a sitting occupant in an inflated and deployed state in a side view.

11 Claims, 4 Drawing Sheets

(56) References Cited

U.S. PATENT DOCUMENTS

| | | | |
|---|---|---|---|
| 2004/0130127 A1* | 7/2004 | Kurimoto et al. ............ 280/729 |
| 2006/0202450 A1* | 9/2006 | Madasamy ....... B60R 21/23138 |
| | | | 280/729 |
| 2007/0108745 A1* | 5/2007 | Belwafa ............ B60R 21/23138 |
| | | | 280/730.2 |
| 2007/0267854 A1* | 11/2007 | Fukuda et al. ............. 280/730.2 |
| 2011/0248485 A1* | 10/2011 | Gwon ........................ 280/730.2 |
| 2012/0200072 A1 | 8/2012 | Fukawatase et al. |
| 2014/0035264 A1* | 2/2014 | Fukushima ....... B60R 21/23138 |
| | | | 280/730.2 |
| 2014/0239618 A1* | 8/2014 | Katsumata ........ B60R 21/23138 |
| | | | 280/728.3 |

FOREIGN PATENT DOCUMENTS

| | | |
|---|---|---|
| JP | A-2010-132072 | 6/2010 |
| JP | A-2011-240807 | 12/2011 |
| JP | A-2012-025182 | 2/2012 |
| JP | A-2012-046050 | 3/2012 |
| JP | 2012-162136 A | 8/2012 |

\* cited by examiner

VEHICLE SIDE AIRBAG DEVICE

INCORPORATION BY REFERENCE

The disclosure of Japanese Patent Application No. 2013-237238 filed on Nov. 15, 2013 including the specification, drawings and abstract is incorporated herein by reference in its entirety.

BACKGROUND OF THE INVENTION

1. Field of the Invention

The present invention relates to a vehicle side airbag device.

2. Description of Related Art

A side airbag device described in Japanese Patent Application Publication No. 2008-201175 (JP 2008-201175 A) has an inside-outside double bag structure constituted by a high-pressure inner bag and a low-pressure outer bag. In the side airbag device, the low-pressure outer bag covers from a back of an occupant (AM50) of a standard figure to a front end of an abdomen, and the high-pressure inner bag covers from the back of the occupant to a central part of ribs in a vehicle longitudinal direction, in a side view. Hereby, a relatively high rigidity of a rear part of the occupant is used for occupant protection by the side airbag.

In the meantime, at the time of a lateral collision of a vehicle, it is preferable to restrain that shoulder of the occupant which has a relatively high tolerance, by a high-pressure bag. However, in the side airbag device having the inside-outside double bag structure as described above, an expansion width of the high-pressure inner bag in a vehicle width direction cannot be made thicker than an expansion width of the low-pressure outer bag in the vehicle width direction. On that account, there is room for improvement from a viewpoint of improving shoulder restraining performance.

SUMMARY OF THE INVENTION

The present invention provides a vehicle side airbag device that can contribute to an improvement in shoulder restraining performance.

An aspect of the present invention relates to a vehicle side airbag device. The vehicle side airbag device includes: an inflator for generating gas by activation; a bag body provided in a side portion of a seatback of a vehicle seat and configured to be inflated and deployed toward a vehicle front side relative to the side portion when the gas is supplied thereinside; and a partition portion partitioning the bag body into a front bag portion and a rear bag portion to be inflated at a higher pressure than the front bag portion and having a thicker inflation width in a vehicle width direction than that of the front bag portion, the partition portion being overlapping with a central part of a shoulder of a sitting occupant in an inflated and deployed state in a side view.

Note that, in the above aspect, a positional relationship between the shoulder of the sitting occupant and the partition portion is set by use of a dummy of AM50 sitting on a vehicle seat.

Further, the "central part of the shoulder" described in the aspect is within a range of a virtual circle having a diameter of 80 mm, around a bolt provided in the shoulder of the dummy, when the dummy of AM50 is viewed from its lateral side.

In the above aspect, the inflator is activated at the time when the vehicle has a lateral collision, for example. Hereby, gas is supplied into the bag body, so that the bag body is inflated and deployed toward a vehicle front side relative to the side portion of the seatback. In the inflated and deployed state, the partition portion partitioning the bag body into the front bag portion and the rear bag portion overlaps with the central part of the shoulder of the sitting occupant in a side view. Then, the rear bag portion is inflated at a higher pressure than the front bag portion, and the inflation width of the rear bag portion hi the vehicle width direction is thicker than that of the front bag portion. As a result, the shoulder of the sitting occupant can be restrained mainly by the high-pressure rear bag portion, thereby making it possible to contribute to an improvement of restraining performance to the shoulder.

Besides, at the time of the restraint, the shoulder is also pressed toward the vehicle front side by the high-pressure rear bag portion having a thick inflation width. As a result, an upper body of the sitting occupant is twisted so that a back of the sitting occupant faces the rear bag portion. Hereby, the back having a relatively high tolerance can be restrained by the rear bag portion. This makes it possible to reduce a load to the sitting occupant.

As described above, the vehicle side airbag device according to the above aspect of the present invention can contribute to an improvement of the shoulder restraining performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
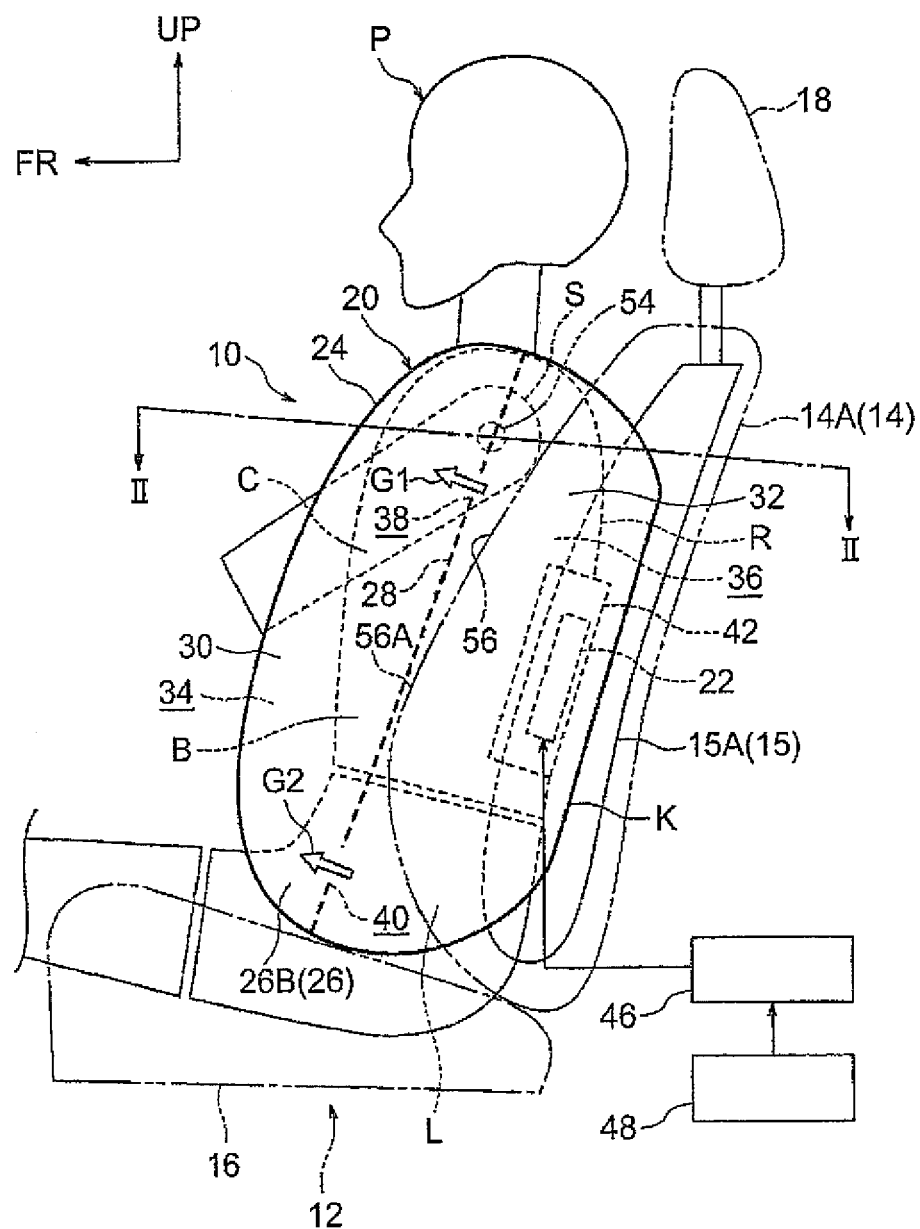
FIG. 1 is a side view illustrating an inflated and deployed state of a side airbag in a vehicle side airbag device according to a first embodiment of the present invention.
Figure 2:
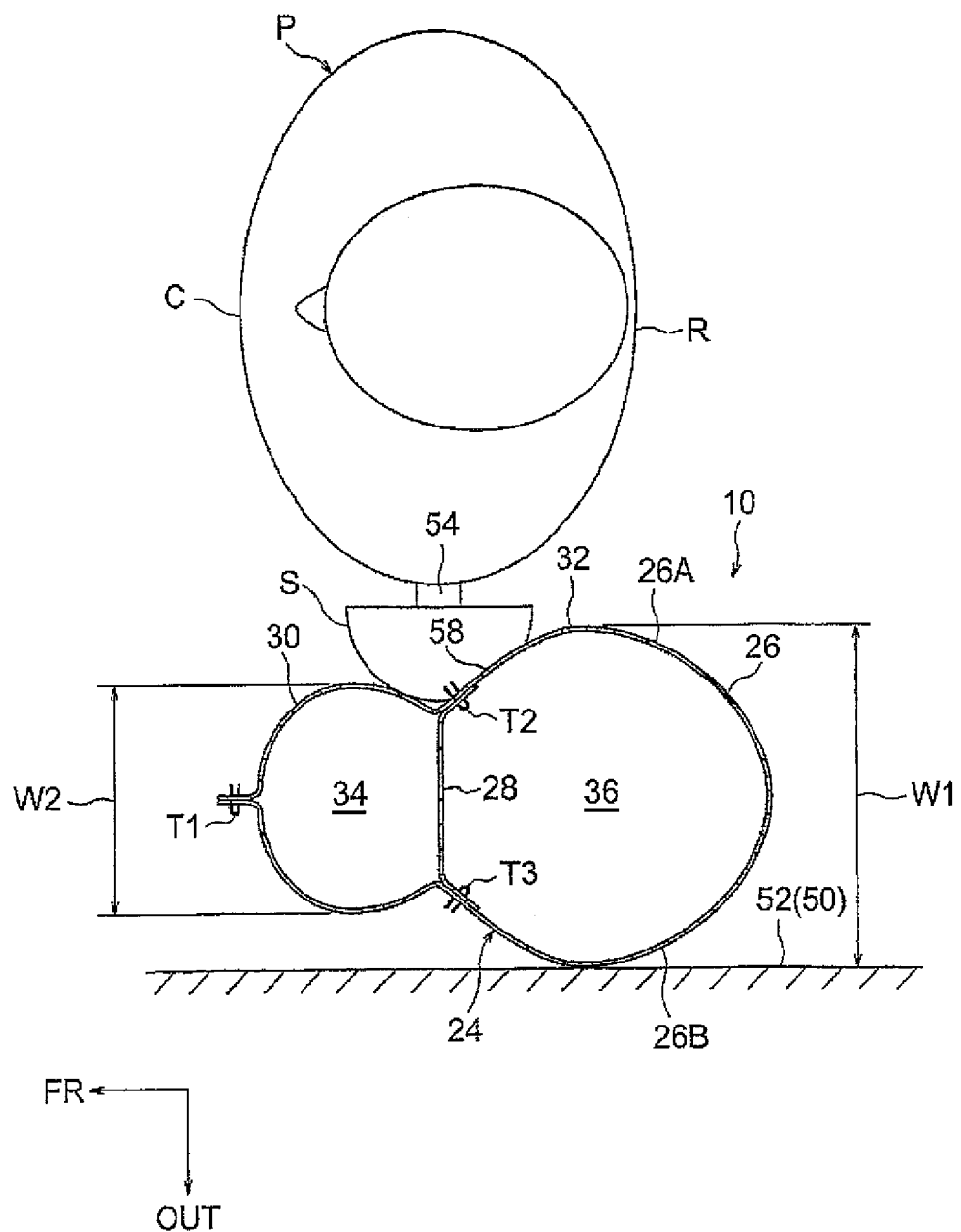
FIG. 2 is an enlarged sectional view illustrating a cut surface along a line II-II in FIG. 1 in an enlarged manner.
Figure 3:
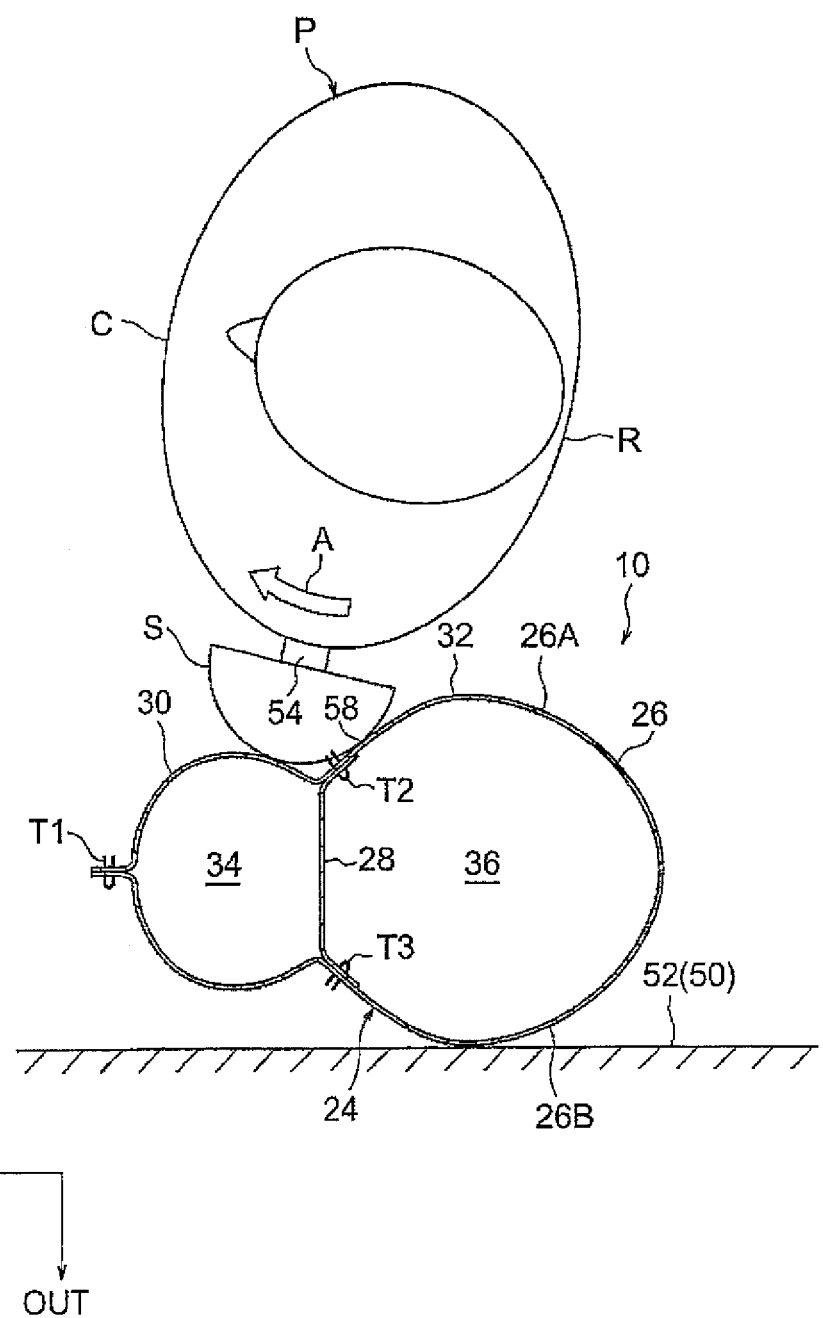
FIG. 3 is a sectional view corresponding to FIG. 2 and illustrates a state where an upper body of a sitting occupant is twisted by being pushed by a rear bag portion of the vehicle side airbag device according to the first embodiment of the present invention.

The following describes a vehicle side airbag device 10 according to a first embodiment of the present invention with reference to FIGS. 1 to 3. Note that an arrow FR, an arrow UP, and an arrow OUT, which are shown appropriately in each figure, indicate a vehicle front direction (a traveling direction), a vehicle upper direction, and an outer side in a vehicle width direction, respectively. Hereinafter, in a case where a description is made by use of merely front and rear directions, right and left directions, and upper and lower directions, they indicate front and rear sides in a vehicle longitudinal direction, right and left sides in a vehicle right-left direction (a vehicle width direction), and upper and lower sides in a vehicle up-down direction, respectively, unless otherwise specified.

Configuration

As illustrated in FIG. 1, the vehicle side airbag device 10 according to the present embodiment is provided in a door side portion 14A (an outer side portion in the vehicle width direction) in a seatback 14 of a vehicle seat 12. The vehicle seat 12 is a driver seat of a left-hand drive, for example. The seatback 14 of the vehicle seat 12 is connected to a rear end of a seat cushion 16 in a tilting manner, and a headrest 18 is connected to an upper end of the seatback 14.

Note that, in the present embodiment, a longitudinal direction, a right-left direction (width direction) and a up-down direction of the vehicle seat 12 coincide with the longitudinal direction, the right-left direction (width direction), and the up-down direction of the vehicle. Further, in FIG. 1, a dummy P for impact test sits on the vehicle seat 12, instead of an actual occupant. The dummy P is, for example, AM50 (50th-percentile American adult male) of World SID (World Side Impact Dummy). Hereinafter, the dummy P is referred to as the "sitting occupant P" in order to make the description understandable.

The vehicle side airbag device 10 mainly includes a side airbag 20, and an inflator 22 (gas generator) for generating gas in the side airbag 20. The side airbag 24 is folded and modularized with the inflator 22, etc., and is disposed (housed) in the door side portion 14A. Upon receipt of a pressure of the gas generated from the inflator 22, the side airbag 20 is inflated and deployed between the sitting occupant P and a side door 50 (see FIGS. 2 and 3). At the time when the side airbag 20 is inflated and deployed, a seatback pad and a seat skin (not shown) disposed in the door side portion 14A are broken by receiving an inflation pressure of the side airbag 20. Note that front, rear, upper, and lower directions of the side airbag 20 to be describe in the following description indicate directions in a state where the side airbag 20 is inflated and deployed, unless otherwise specified, and generally coincide with front, rear, upper, and lower direction of the seatback 14.

As illustrated in FIGS. 1 to 3, the side airbag 20 is a two-chamber side airbag partitioned into two front and rear chambers, and includes a bag body 24 formed in a bag shape. The bag body 24 is formed by sewing one base cloth 26 formed by cutting a nylon or polyester fabric material, for example. The base cloth 26 is folded in two along a fold line k, and outer peripheries of one side portion 26A and the other side portion 26B via the fold line k are sewed at a sewing portion T1. Note that, in FIG. 1, the sewing portion T1 and the after-mentioned sewing portions T2, T3 are not illustrated.

When an inflated and deployed state of the bag body 24 is viewed in a side view as illustrated in FIG. 1, the bag body 24 is formed in a generally oblong shape elongated along the up-down direction of the seatback 14, and is set to have a size that can restrain a shoulder S, a chest C an abdomen B, and a lumbar L of the sitting occupant P. A tether 28 (a partition cloth) serving as a partition portion is provided inside the bag body 24.

The tether 28 is formed by cutting a fabric material similar to the base cloth 26, into an elongated shape. One long side edge of the tether 28 is sewed to the one side portion 26A of the base cloth 26 at the sewing portion T2, and the other long side edge of the tether 28 is sewed to the other side portion 26B of the base cloth 26 at the sewing portion T3.

The bag body 24 is partitioned by the tether 28 into a front bag portion 30 and a rear bag portion 32.

An inside of the front bag portion 30 is a front chamber 34, and an inside of the rear bag portion 32 is a rear chamber 36. The front chamber 34 communicates with the rear chamber 36 via upper and lower communicating holes 38, 40 formed in the tether 28 (see FIG. 1) (note that, in FIG. 1, the tether 28 and the communicating holes 38, 40 are illustrated schematically). The communicating holes 38, 40 are circular openings. The upper communicating hole 38 is formed in an upper part of the tether 28. In a state where the bag body 24 is inflated and deployed, the upper communicating hole 38 is placed on a lateral side of the shoulder S, on a slightly lower side relative to a central part of the shoulder S of the sitting occupant P. The lower communicating hole 40 is formed in a lower part of the tether 28. In a state where the bag body 24 is inflated and deployed, the lower communicating hole 40 is placed on a lateral side of the lumbar L of the sitting occupant P.

Further, a flow straightening cloth 42 is provided in the rear bag portion 32. The flow straightening cloth 42 is formed by sewing a base cloth made from a fabric material similar to the base cloth the 26, into a tubular shape. The flow straightening cloth 42 is disposed in a up-down-direction central part of a rear end of the rear bag portion 32 in a state where its axis direction is along the up-down direction of the seatback 14.

Further, the inflator 22 is housed in the rear bag portion 32. The inflator 22 is a so-called cylinder inflator, and is formed in a cylindrical shape. The inflator 22 is housed in the flow straightening cloth 42 in a state where its axis direction is along the up-down direction of the seatback 14.

A pair of upper and lower stud bolts (not shown) projects from an outer peripheral portion of the inflator 22 toward a vehicle rear side. The stud bolts penetrate through the base cloth 26 and the flow straightening cloth 42, and further penetrate through brackets (not shown) fixed to a side frame 15A (see FIG. 1) of a seatback frame 15. Nuts (not shown) are engaged threadedly to tip sides of the stud bolts. Hereby, the inflator 22 and the side airbag 20 are fastened and fixed to the side frame 15A (that is, their back surfaces are fastened thereto). Note that, the stud bolts projecting inwardly in the vehicle width direction from the outer peripheral portion of the inflator 22 may directly penetrate through the side frame 15A so as to be engaged threadedly to nuts (that is, their side surfaces are fastened thereto).

A lateral collision ECU 46 provided in the vehicle is electrically connected to the inflator 22, as illustrated in FIG. 1. A lateral collision sensor 48 for detecting a lateral collision is electrically connected to the lateral collision ECU 46. The lateral collision ECU 46 is configured to activate the inflator 22 at the time when the lateral collision ECU 46 detects a lateral collision (or inevitability thereof) based on a signal from the lateral collision sensor 48. Note that, in a case where a pre-crash sensor for predicting (forecasting) a lateral collision is electrically connected to the lateral collision ECU 46, the lateral collision ECU 46 may be configured to activate the inflator 22 at the time when the lateral collision ECU 46 predicts a lateral collision based on a signal from the pre-crash sensor.

In the side airbag device 10 thus configured, when the inflator 22 is activated, gas is injected from a gas injection portion provided in an upper end or a lower end of the inflator 22. The gas injected from the inflator 22 is injected from an upper end opening of the flow straightening cloth 42 to an upper part inside the rear bag portion 32, and is also injected from a lower end opening of the flow straightening cloth 42 toward a lower part inside the rear bag portion 32. The gas thus injected toward the upper part and the lower part inside the rear bag portion 32 is supplied into the front bag portion 30 via the upper and lower communicating holes 38, 40 (see arrows G1, G2 in FIG. 1). Hereby, the side airbag 20 (the sack body 24) is inflated and deployed between the sitting occupant P and a door trim 52 (a vehicle-body side portion) of the side door 50. The following describes the inflated and deployed state of the side airbag 20, more specifically.

In the inflated and deployed state of the side airbag 20, the front bag portion 30 and the rear bag portion 32 are aligned in the vehicle longitudinal direction, so that a front part of the sitting occupant P from the shoulder S to the abdomen B or the lumbar L is restrained by the front bag portion 30, and a rear part of the sitting occupant P from the shoulder S to the abdomen B or the lumbar L is restrained by the rear bag portion 32. Further, the tether 28 extends along a height direction of the seatback 14 between the front bag portion 30 and the rear bag portion 32, and the upper part of the tether 28 overlaps with a center of the shoulder S of the sitting occupant P (here, a bolt 54 provided in the shoulder S of the dummy P) in a side view. Note that, in the present embodiment, the tether 28 is slightly inclined with respect to a height direction of the upper body of the sitting occupant P so that the tether 28 is inclined toward a front side as it goes toward a lower side.

A position of the tether 28 in the seatback longitudinal direction is set according to a front end 56A (see FIG. 1) of a side pad portion 56 of the door side portion 14A. That is, in a height of the front end 56A of the side pad portion 56, a forward projection amount of the rear bag portion 32 from the side pad portion 56 is small or zero (generally zero). That is, in the present embodiment, a sewing position of the tether 28 to the bag body 24 is set so that, even when the side airbag 20 is inflated and deployed in a state where the sitting occupant P is placed in an inappropriate position, which is an inflated and deployed area of the side airbag 20, the side airbag 20 less affects the sitting occupant P.

Note that the configuration in which the upper part, of the tether 28 overlaps with the center of the shoulder S of the sitting occupant P in a side view (align in the vehicle transverse direction) is not the Only option, and such a configuration may be taken that the upper part of the tether 28 overlaps with a central part (the center and its peripheral area) of the shoulder S of the sitting occupant P in a side view. In this case, the central part of the shoulder S is within a range of a virtual circle having a diameter of 80 mm around the bolt 54 provided in the shoulder S, when the sitting occupant P (the dummy F) is viewed from the lateral side.

The tether 28 is provided so as to be placed on a front side relative to a center of the bag body 24 inflated and deployed in the vehicle longitudinal direction. In view of this, when viewed in a plane section as illustrated in FIG. 2, a circumference of the rear bag portion 32 is longer than a circumference of the front bag portion 30, and an inflation width W1 of the rear bag portion 32 in the vehicle width direction is thicker (larger) than an inflation width W2 of the front bag portion 30 in the vehicle width direction. A curved surface 58 curved outwardly in the vehicle width direction as it goes toward a vehicle front side is formed on a front side of an inner surface of the rear bag portion 32 in the vehicle width direction, so that the curved surface 58 makes contact with the shoulder S from an outer side in the vehicle width direction and the vehicle rear side.

Further, in the present embodiment, the gas injected into the rear bag portion 32 from the inflator 22 is supplied into the front bag portion 30 via the upper and lower communicating holes 38, 40 formed in the tether 28. Accordingly, an internal pressure. P1 of the front bag portion 30 is lower than an internal pressure P2 of the rear bag portion 32 (P1<P2). Note that, a vent hole may be formed in a front edge of the front bag portion 30, so that the gas supplied into the front bag portion 30 is discharged outside the side airbag 20 through the vent hole. This makes it possible to reduce a part of the front bag portion 30 remaining in the inflated and deployed state at the time of restraint of the occupant, so that it is possible to secure an impact absorption stroke of the front bag portion 30 successfully.

Operations and Effects

Next will be described operations and effects of the first embodiment.

In the vehicle side airbag device 10 configured as described above, when the lateral collision ECU 46 detects a lateral collision based on a signal from the lateral collision sensor 48, the inflator 22 is activated by the lateral collision ECU 46. Hereby, gas is supplied into the bag body 24 of the side airbag 20, so that the bag body 24 is inflated and deployed toward a front side relative to the side portion of the seatback. In the inflated and deployed state, the tether 28 partitioning the bag body 24 into the front bag portion 30 and the rear bag portion 32 overlaps with the center of the shoulder S of the sitting occupant P in a side view. Then, the rear bag portion 32 is inflated at a higher pressure than the front bag portion 30, and the inflation width of the rear bag portion 32 in the vehicle width direction is thicker than that of the front bag portion 30. As a result, the shoulder S of the sitting occupant P can be restrained mainly by the high-pressure rear bag portion 32, thereby making it possible to contribute to an improvement of restraining performance to the shoulder S.

Besides, at the time of the restraint, the shoulder S is also pressed toward the vehicle front side by the curved surface 58 of the high-pressure rear bag portion 32 having a thick inflation width. As a result, the upper body of the sitting occupant P is twisted so that the back R of the sitting occupant P faces the rear bag portion 32. That is, as illustrated by an arrow A in FIG. 3, the upper body of the sitting occupant P is rotated around a generally up-down axis, so that the back R of the sitting occupant P faces the side airbag 20. Hereby, the back R having a relatively high tolerance can be restrained by the rear bag portion 32, thereby making it possible to reduce a load to the sitting occupant P. Further, since the chest C is displaced (rotated) to a direction apart from the side airbag 20, it is possible to reduce a load to the chest C.

Further, in the present embodiment, the gas injected from the inflator 22 disposed inside the rear bag portion 32 is supplied into the front bag portion 30 via the upper and lower communicating holes 38, 40 formed in the tether 28. Hereby, it is possible to inflate and deploy the rear bag portion 32 earlier at a higher pressure than the front bag portion 30, with a simple configuration. Besides, the upper communicating hole 38 is placed on the lateral side of the shoulder S, on the slightly lower side relative to the central part of the shoulder S of the sitting occupant P, and the lower communicating hole 40 is placed on the lateral side of the lumbar L of the sitting occupant P. This makes it possible to inflate and deploy earlier that pad of the front bag portion 30 which restrains the shoulder S and the lumbar L.

Further, in the present embodiment, while that rear part of the sitting occupant P from the shoulder S to the lumbar L which has a relatively high tolerance is restrained by the high-pressure rear bag portion 32, that front part of the sitting occupant P from the shoulder S to the abdomen or lumbar which has a relatively low tolerance is softly restrained by the low-pressure front bag portion 30. Accordingly, it is possible to appropriately restrain the sitting occupant P at internal pressures according to physical tolerances of the sitting occupant P.

Further, in the present embodiment, in the height of the front end 56A of the side pad portion 56 of the door side portion 14A, the forward projection amount of the rear bag portion 32 from the side pad portion 56 is set to be small or zero. Hereby, even when the side airbag 20 is inflated and deployed in a state where the sitting occupant P is placed in an inappropriate position, which is the inflated and deployed area of the side airbag 20, it is possible to achieve performance of reducing an effect to the sitting occupant P (so-called OOP performance; OOP=out of position) successfully.

In addition, in the present embodiment, since the front bag portion 30 is inflated and deployed at a low pressure after the rear bag portion 32 is inflated and deployed, it is possible to achieve the OOP performance further successfully.

Next will be described a second embodiment of the present invention. Note that a configuration/operation basically similar to a configuration/operation of the first embodiment has the same reference sign as the configuration/operation of the first embodiment, and its description is omitted.

Second Embodiment

Figure 4:
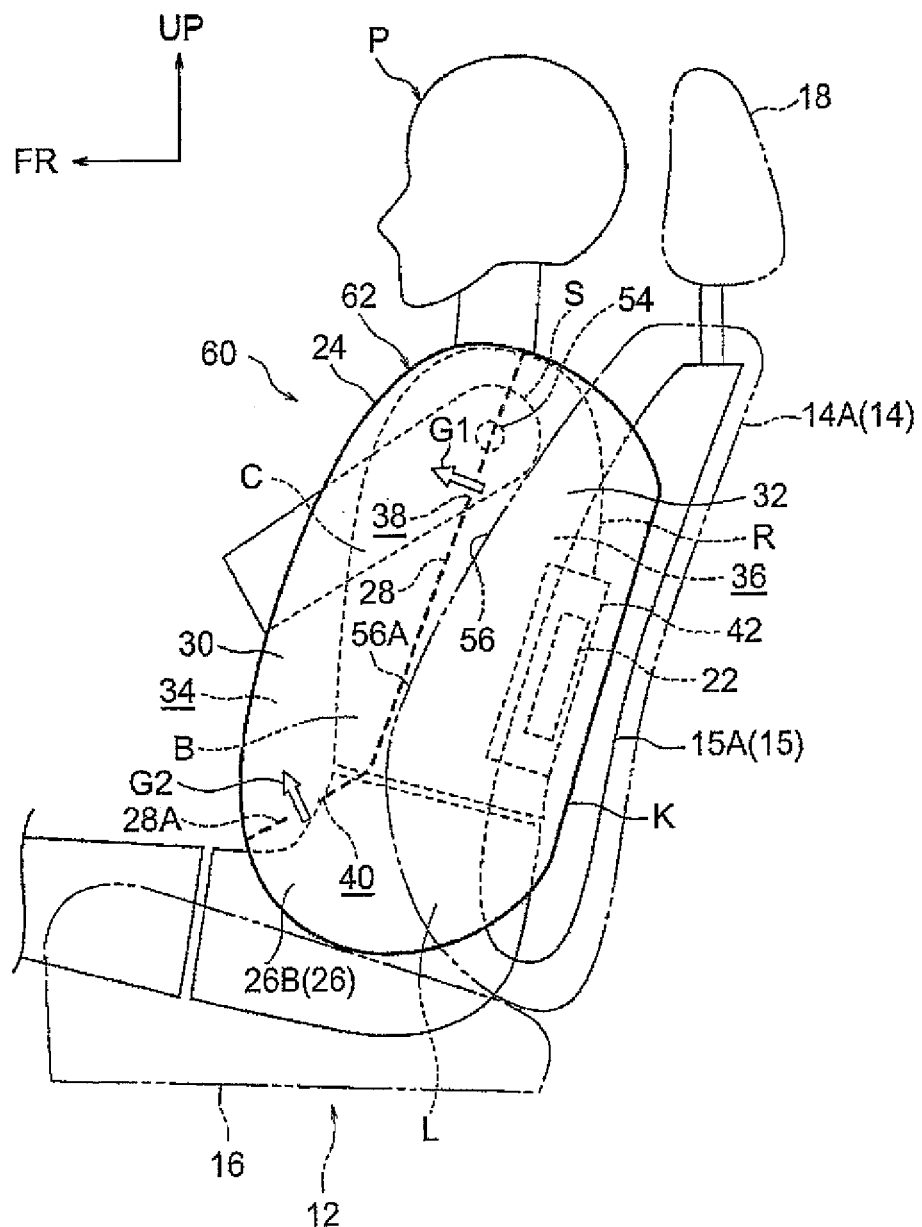
FIG. 4 is a side view of a vehicle seat provided with a vehicle side airbag device according to a second embodiment of the present invention, and illustrates an inflated and deployed state of a side airbag thereof.

FIG. 4 is a side view illustrating an expanded unfolded state of a side airbag 62 in a vehicle side airbag device 60 according to a second embodiment of the present invention. In the side airbag 62, an inclined portion 28A extending diagonally downward toward a vehicle front side is provided in a lower part of a tether 28.

This embodiment basically has a configuration similar to the first embodiment except for the above configuration. Accordingly, even in the present embodiment, it is possible to obtain basically the same effect as the first embodiment. Besides, in the present embodiment, since the inclined portion 28A is provided in the lower part of the tether 28, a lower part of a rear bag portion 32 is enlarged toward the vehicle front side. Hereby, it is possible to improve restraining performance of the high-pressure rear bag portion 32 with respect to the lumbar L.

Supplementary Description of Embodiments

In each of the above embodiments, the bag body 24 of the side airbag 20 is configured to have a size that can restrain the sitting occupant P from the shoulder S to the lumbar L. However, the present invention is not limited to this, and the bag body may be formed so as to have a size that can restrain the sitting occupant from the shoulder to the abdomen.

Further, in each of the above embodiments, the upper and lower communicating holes 38, 40 are formed in the tether 28 serving as a partition portion. However, the present invention is not limited to this, and the number and position of communicating holes formed in a partitioned section can be modified appropriately.

Further, in each of the above embodiments, the gas injected from the inflator 22 disposed inside the rear bag portion 32 is supplied into the front bag portion 30 via the upper and lower communicating holes 38, 40 formed in the tether 28. However, the present invention is not limited to this. For example, the gas from the inflator 22 disposed inside the rear bag portion 32 may be supplied into the front bag portion through an exclusive gas passage that does not pass through the rear bag portion.

Further, in each of the above embodiments, the tether 28 made of a fabric material is the partition portion. However, the present invention is not limited to this, and the partition portion may be constituted by a sewing portion to which the bag body is sewed.

In addition, the present invention can be performed with various modifications without departing from a gist of the present invention. Further, it is needless to say that the scope of the present invention is not limited to each of the above embodiments.

What is claimed is:

1. A vehicle side airbag device comprising:
    an inflator for generating gas by activation;
    a bag body communicating with the inflator and provided in a side portion of a seatback of a vehicle seat and configured to be inflated and deployed toward a vehicle front side relative to the side portion when the gas generated by the inflator is supplied to an inside of the bag body; and
    a partition that partitions the bag body into a front bag portion and a rear bag portion to be inflated at a higher pressure than the front bag portion in an inflated and deployed state, the rear bag portion having a larger inflation width in a vehicle width direction than an inflation width of the front bag portion, the partition is inclined toward the vehicle front side as the partition extends toward a lower side of the bag body in the inflated and deployed state of the bag body, the partition having a lower part that extends diagonally downward toward the vehicle front side at an angle greater than an angle at which an upper part of the partition extends diagonally toward the vehicle front side, wherein:
    the inflator is disposed in the rear bag portion,
    a communicating hole via which the gas injected from the inflator into the rear bag portion is supplied to the front bag portion is formed in the partition,
    the partition is a tether,
    the communicating hole is formed in the upper part of the tether,
    the partition is configured to overlap a central part of a shoulder of a dummy of AM 50 in an inflated and deployed state in a side view,
    the rear bag portion has a curved surface that is configured to press the shoulder of the dummy of AM 50 toward the vehicle front side, and
    the front bag portion has a curved surface that is configured to contact the shoulder of the dummy of AM 50.

2. The vehicle side airbag device according to claim 1, wherein:
    the bag body and the partition are configured such that the front bag portion restrains a front part of a sitting occupant from a shoulder to an abdomen or lumbar, and the rear bag portion restrains a rear part of the sitting occupant from the shoulder to the abdomen or lumbar.

3. The vehicle side airbag device according to claim 1, wherein:
    at least two of the communicating holes are formed in the upper part and the lower part of the tether.

4. The vehicle side airbag device according to claim 1, wherein:
a position of the partition with respect to the seatback in the vehicle longitudinal direction in the inflated and deployed state of the bag body is set according to a front end of a side pad portion of the seatback in a height of the front end of the side pad portion.

5. The vehicle side airbag device according to claim 4, wherein:
the position of the partition with respect to the seatback in the vehicle longitudinal direction is a position at which a forward projection amount of the rear bag portion from the side pad portion is zero.

6. The vehicle side airbag device according to claim 1, wherein:
a circumference of the rear bag portion is longer than a circumference of the front bag portion in a horizontal sectional view.

7. The vehicle side airbag device according to claim 1, wherein:
a curved surface curved outwardly in the vehicle width direction as the curved surface goes toward the vehicle front side is formed on a front side of an inner surface of the rear bag portion in the vehicle width direction, and is positioned to make contact with an occupant's shoulder from an outer side in the vehicle width direction and a vehicle rear side.

8. The vehicle side airbag device according to claim 1, wherein:
in the inflated and deployed state of the bag body, a width in the vehicle width direction of the partition is less than (i) a width in the vehicle width direction of a portion of the front bag portion located immediately adjacent to the partition, and (ii) a width in the vehicle width direction of a portion of the rear bag portion located immediately adjacent to the partition.

9. A vehicle side airbag device comprising:
an inflator for generating gas by activation;
a bag body communicating with the inflator and provided in a side portion of a seatback of a vehicle seat and configured to be inflated and deployed toward a vehicle front side relative to the side portion when the gas generated by the inflator is supplied to an inside of the bag body; and
a partition that partitions the bag body into a front bag portion and a rear bag portion to be inflated at a higher pressure than the front bag portion in an inflated and deployed state, the rear bag portion having a larger inflation width in a vehicle width direction than an inflation width of the front bag portion, the partition is inclined toward the vehicle front side as the partition extends toward a lower side of the bag body in the inflated and deployed state of the bag body, the partition having a lower part that extends diagonally downward toward the vehicle front side at an angle greater than an angle at which an upper part of the partition extends diagonally toward the vehicle front side, wherein:
the inflator is disposed in the rear bag portion,
a communicating hole via which the gas injected from the inflator into the rear bag portion is supplied to the front bag portion is formed in the partition,
the partition is a tether,
the communicating hole is formed in the lower part of the tether,
the partition is configured to overlap a central part of a shoulder of a dummy of AM 50 in an inflated and deployed state in a side view,
the rear bag position has a curved surface that is configured to press the shoulder of the dummy of AM 50 toward the vehicle front side, and
the front bag portion has a curved surface that is configured to contact the shoulder of the dummy of AM 50.

10. A vehicle side airbag device comprising:
an inflator for generating gas by activation;
a bag body communicating with the inflator and provided in a side portion of a seatback of a vehicle seat and configured to be inflated and deployed toward a vehicle front side relative to the side portion when the gas generated by the inflator is supplied to an inside of the bag body; and
a partition that partitions the bag body into a front bag portion and a rear bag portion to be inflated at a higher pressure than the front bag portion in an inflated and deployed state, the rear bag portion having a larger inflation width in a vehicle width direction than an inflation width of the front bag portion, the partition is inclined toward the vehicle front side as the partition extends toward a lower side of the bag body in the inflated and deployed state of the bag body, the partition having a lower part that extends diagonally downward toward the vehicle front side at an angle greater than an angle at which an upper part of the partition extends diagonally toward the vehicle front side, wherein:
the inflator is disposed in the rear bag portion,
a communicating hole via which the gas injected from the inflator into the rear bag portion is supplied to the front bag portion is formed in the partition, and
a position of the partition with respect to the seatback in the vehicle longitudinal direction in the inflated and deployed state of the bag body is set according to a front end of a side pad portion of the seatback in a height of the front end of the side pad portion,
the partition is configured to overlap a central part of a shoulder of a dummy of AM 50 in an inflated and deployed state in a side view,
the rear bag portion has a curved surface that is configured to press the shoulder of the dummy of AM 50 toward the vehicle front side and
the front bag portion has a curved surface that is configured to contact the shoulder of the dummy of AM 50.

11. The vehicle side airbag device according to claim 10, wherein:
the position of the partition with respect to the seatback in the vehicle longitudinal direction is a position at which a forward projection amount of the rear bag portion from the side pad portion is zero.

* * * * *